Patented Apr. 28, 1953

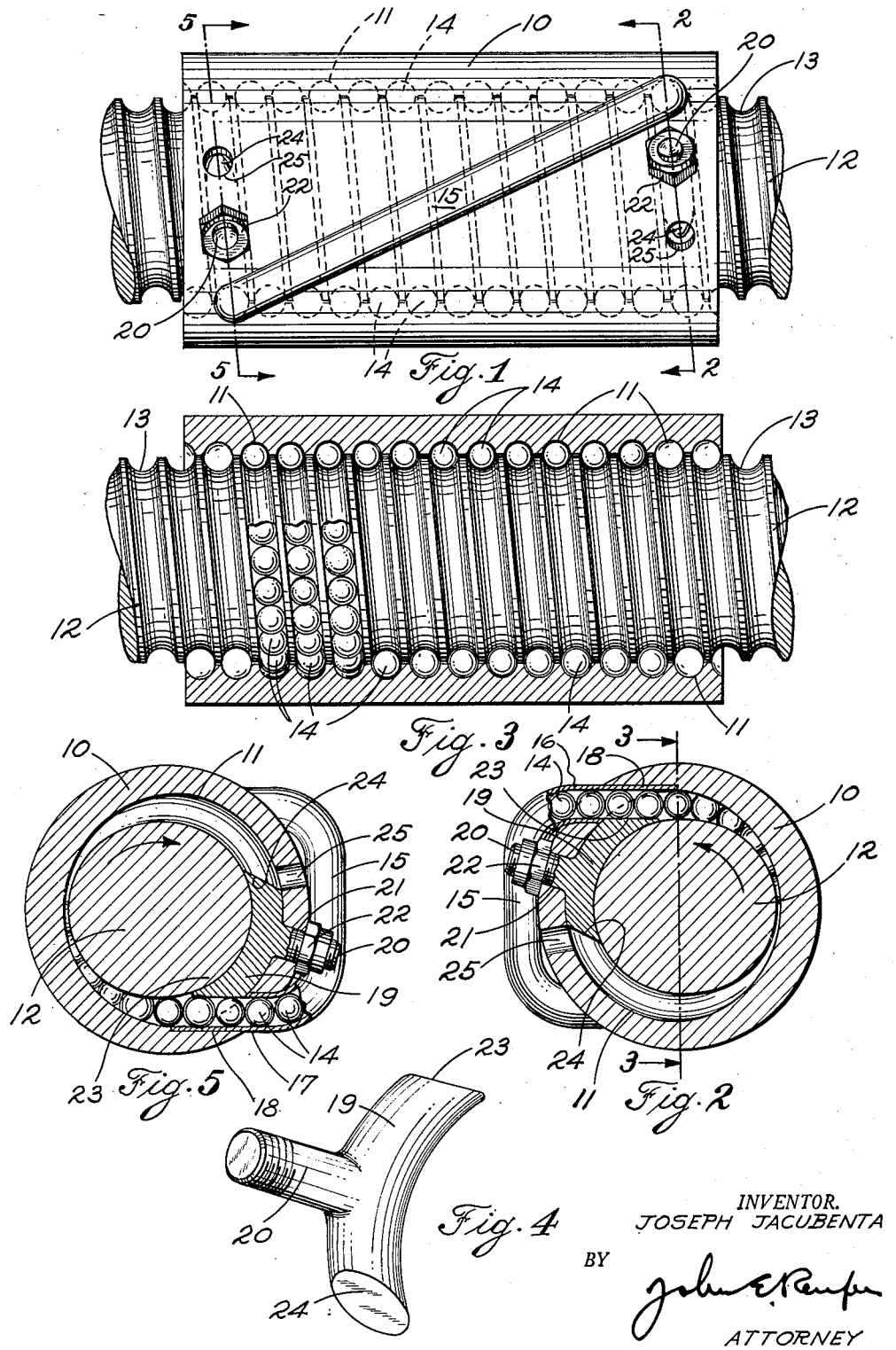

2,636,397

UNITED STATES PATENT OFFICE 2,636,397

BALL DEFLECTOR AND SCREW CLEANER FOR BALL-BEARING SCREW AND NUT ASSEMBLIES

Joseph Jacubenta, Maple Heights, Ohio, assignor to The Cleveland Pneumatic Tool Company, Cleveland, Ohio, a corporation of Ohio Application February 8, 1951, Serial No. 210,038

3 Claims. (Cl. 74—459)

1

This invention relates broadly to anti-friction screw and nut mechanism of the ball-bearing type, but more particularly to a dirt remover for such mechanism.

The main object of this invention is to provide a ball-bearing screw and nut assembly with a scraper in both ends of the nut adapted to remove foreign matter such as dirt, ice and the like from the screw thread before it becomes in contact with the balls circulating in the nut.

Another object of this invention is to provide such screw and nut assembly with a solid deflector, mounted in each end of the nut being shaped and disposed in a manner causing one of its ends to act as a guide for the balls moving from the screw into the transfer tube, and the other end to act as a scraper for removing foreign matter from the screw.

Other objects of this invention will be apparent from the following detailed description wherein similar characters of references designate corresponding parts and wherein:

Figure 1 is a side view of a ball-bearing screw and nut assembly embodying the invention.

Figure 2 is a cross sectional view taken on line 2—2 in Figure 1.

Figure 3 is a longitudinal view, partly in section, taken on line 3—3 in Figure 2.

Figure 4 is a perspective view of the solid deflector shown in section in Figures 2 and 5.

Figure 5 is a cross sectional view, similar to Figure 2, taken on line 5—5 in Figure 1.

With reference to the drawing, it is to be understood that except for the deflector shown in Figure 4 and its disposition in the ball-bearing screw and nut assembly, that assembly is one of the usual type which ordinarily consists of a nut member 10 having its inner surface provided with a spiral groove 11. In cross section, this groove is slightly less than a semi-circle.

Extending through the nut 10, there is a shaft, hereinafter referred to as screw member 12, having its surface provided with a complemental groove 13, corresponding in pitch to the pitch of the nut groove 11, and of a cross section also slightly less than a semi-circle.

When the grooves 11 and 13 are located to coincide, they form a spiral channel of substantially circular cross-section, in which are inserted a plurality of anti-friction balls 14, which interconnect the nut and screw members, and effect the axial movement of one relative to the other upon rotation of either of said members.

As usual in anti-friction screw and nut of the ball-bearing type, there is provided a ball recirculating device, which in this instance includes

2 a transfer tube 15 which is substantially U-shaped, and has end portions 16 and 17 fitted and preferably welded in holes 18 drilled through the wall of the nut near each end thereof. The holes 18 are located tangentially with the spiral channel formed by nut and screw grooves 11 and 13. Heretofore, the extreme end of each tube portion 16 and 17 was made to extend into the spiral channel to effect deflection of the balls from the channel into the tube. In the present construction, the extreme end of each tube portion 16 and 17 is shaped to correspond to the bottom of the nut groove 11, and consequently does not act as a deflector for the balls 14.

Referring now more particularly to the invention, 19 designates a finger which is arcuated with a pitch diameter equal to that of the spiral channel and of a circular cross section having a diameter substantially equal to but preferably slightly smaller than that of the spiral channel. In other words, the finger 19 is shaped and dimensioned to fit closely within the spiral channel defined by the grooves 11 and 13. One of said finger 19 is located in the spiral channel between each end of the nut 10 and the adjacent end portion 16 or 17 of the transfer tube 15. Extending outwardly and radially from the finger 19, there is an integral screw threaded stem 20 which projects through a radial orifice 21 provided through the wall of the nut 10, and is adapted to cooperate with a nut or clamping element 22 by which the finger is held stationary in the spiral channel. The length and location of the finger 19 is calculated to cause its end 23, hereinafter referred to as guiding end, to be located tangentially with the bottom of the screw groove 13 and act as a bridge interconnecting the bottom of that groove and the corresponding end of the tube end portion 16 or 17. It will thus be understood that the guiding end 23 of each finger 19 acts as a deflector preventing escape of the balls 14 through the ends of the nut during rotation of the screw or nut in one or the other direction. As shown in Figure 2, with the screw 12 rotating in the direction of the arrow, the guiding end 23 of the finger 19 forces the balls 14 to enter the end portion 16 of the transfer tube 15, where they are pushed through by succeeding balls, until they emerge into the spiral channel through the transfer tube end portion 17.

Since the guiding end 23 of the finger 19 causes deflection of the balls 14 into the transfer tube 15, it will be understood that from the other end 24 of the finger, which may hereinafter be referred to as the scraper end, and the adjacent end of the nut 10, the spiral channel does not have any ball located therein. From the bottom of the screw groove 13, the end 24 of the finger 19 extends outward at a steep incline to form a scraping surface leading to a cleaning port 25 which extends through the wall of the nut 10. This scraping surface 24 has its outer edge fitting closely in the spiral channel and groove 13 of the screw 12, to remove any foreign matter which might have accumulated in the exposed portion of the screw groove outside the nut 10. Since the scraping surface 24, relative to the direction of rotation of either the nut 10 or screw 12, is located ahead of the balls 14, it will clean the screw groove 13 and eject foreign matter through the cleaning port 25, before contact of the screw groove with the balls, thereby eliminating the need of screw protectors or covers such as collapsible boots or telescoping tubes.

From the foregoing description, it will be understood that a simple and efficient device has been provided for cleaning the screw before its contact with the nut. In the present construction, the scraper or wiper also functions as a simple and efficient ball deflector which has been found to give longer service than deflectors heretofore used for that purpose. It will also be noted that both scraper and deflector are mounted within the ends of the nut without necessitating the nut to be made longer than normal or of larger diameter.

The details of structure and arrangements of parts shown and described may be variously changed and modified without departing from the spirit and scope of the invention.

I claim:

1. In combination, a nut member having a spiral groove in its inner surface, a screw member extending longitudinally through said nut member and having a complemental spiral groove in its surface, said grooves coinciding to form a spiral channel of substantially circular cross section, a transfer tube carried by said nut extending from the opposite end portions thereof, said tube and channel between the ends of said tube being filled with balls interengaged between said two members in the grooves thereof for effecting axial movement of one of said members relative to the other upon rotation of either of them, the ends of said tube opening into said channel, a pair of fingers in said channel fixed to and located in the interior of said nut, each having a guiding end interconnecting the bottom of said channel and the adjacent end of said tube to guide the balls into one end of said tube for recirculation through the other end thereof, a scraping surface on the other end of each finger adjacent each end of said nut adapted to remove foreign matter from the groove of said screw member and a cleaning port extending through said nut adjacent said scraping surface through which said foreign matter may be ejected.

2. The combination of a nut and screw member each having a spiral groove in their adjacent surfaces, a plurality of balls interengaged between said two members in the grooves thereof for effecting axial movement of one member upon relative rotation therebetween, a scraper fixed to and located in the interior of said nut near one end thereof and operatively engaging the groove wall of said screw member to remove foreign matter therefrom during said axial movement and a cleaning port extending through said nut adjacent said scraper through which said foreign matter may be ejected.

3. The combination of a nut and screw member each having a spiral groove in their adjacent surfaces, a plurality of balls interengaged between said two members in the grooves thereof for effecting axial movement of one member upon relative rotation therebetween, a cleaning port through the wall of said nut member, and a finger in said grooves fixed to and located in the interior of said nut member near one end thereof, said finger having an end surface adjacent said port formed with a scraping edge operatively engaging the groove wall of said screw member to remove foreign matter therefrom and eject it through said port via said end surface during said axial movement.

JOSEPH JACUBENTA.

References Cited in the file of this patent

UNITED STATES PATENTS

| Number | Name | Date |
|---|---|---|
| 201,372 | West | Mar. 19, 1878 |
| 888,616 | Kelly | May 26, 1908 |
| 1,785,406 | Cornett | Dec. 16, 1930 |
| 1,937,547 | Cartlidge | Dec. 5, 1933 |
| 1,946,931 | Chong | Feb. 13, 1934 |
| 2,018,124 | Forster | Oct. 22, 1935 |
| 2,505,131 | Means, Jr. | Apr. 25, 1950 |